United States Patent [19]
Kreulen et al.

[11] Patent Number: 5,740,353
[45] Date of Patent: Apr. 14, 1998

[54] METHOD AND APPARATUS FOR CREATING A MULTIPROCESSOR VERIFICATION ENVIRONMENT

[75] Inventors: Jeffrey Thomas Kreulen; Sriram Srinivasan Mandyam; Brian Walter O'Krafka; Shahram Salamian, all of Austin; Ramanathan Raghavan, Round Rock, all of Tex.

[73] Assignee: International Business Machines Corporation, Armonk, N.Y.

[21] Appl. No.: 572,472

[22] Filed: Dec. 14, 1995

[51] Int. Cl.⁶ .................................................. G06F 11/00
[52] U.S. Cl. ............................... 395/183.18; 395/183.09
[58] Field of Search .................... 395/182.08, 183.04, 395/183.06, 183.08, 138.09, 183.18, 183.13, 183.01; 364/580, 243.41, 243.4, 243; 371/27, 21.1

[56] References Cited

U.S. PATENT DOCUMENTS

| | | | |
|---|---|---|---|
| 4,397,021 | 8/1983 | Lloyd et al. | 371/20 |
| 4,554,636 | 11/1985 | Maggi et al. | 364/481 |
| 4,575,792 | 3/1986 | Keely | 395/183.18 |
| 4,633,466 | 12/1986 | Laws et al. | 371/20 |
| 4,802,164 | 1/1989 | Fukouka et al. | 340/825.5 |
| 4,839,895 | 6/1989 | Makita | 371/16 |
| 4,933,941 | 6/1990 | Eckaerd et al. | 395/183.07 |
| 5,091,846 | 2/1992 | Sachs et al. | 395/250 |
| 5,210,757 | 5/1993 | Barlow et al. | 371/16.1 |
| 5,274,797 | 12/1993 | Barlow et al. | 395/200 |
| 5,319,766 | 6/1994 | Thaller et al. | 395/425 |
| 5,323,401 | 6/1994 | Maston | 364/580 |
| 5,341,382 | 8/1994 | Levitt | 371/22.1 |
| 5,355,369 | 10/1994 | Greenbergerl et al. | 371/22.3 |
| 5,355,471 | 10/1994 | Weight | 395/425 |
| 5,404,489 | 4/1995 | Woods et al. | 395/425 |
| 5,406,504 | 4/1995 | Denisco et al. | 364/580 |
| 5,408,629 | 4/1995 | Tsuchiva et al. | 395/425 |
| 5,414,821 | 5/1995 | Nguyen et al. | 395/375 |
| 5,430,850 | 7/1995 | Papadopoulos et al | 395/375 |
| 5,434,805 | 7/1995 | Iwasaki | 364/580 |
| 5,497,458 | 3/1996 | Finch et al. | 395/183.06 |
| 5,513,344 | 4/1996 | Nakamura | 395/183.18 |
| 5,524,208 | 6/1996 | Finch et al. | 395/183.01 |
| 5,535,223 | 7/1996 | Horstmann et al. | 371/27 |
| 5,542,043 | 7/1996 | Cohen et al. | 395/183.08 |
| 5,557,774 | 9/1996 | Shimabukuro et al. | 395/183.22 |
| 5,600,787 | 2/1997 | Underwood et al. | 371/27 |

*Primary Examiner*—Robert W. Beausoliel, Jr.
*Assistant Examiner*—Joseph E. Palys
*Attorney, Agent, or Firm*—David A. Mims, Jr.

[57] ABSTRACT

A method and apparatus for creating a multiprocessor verification environment. A Multiprocessor Test Generator (MPTG) generates a set of test cases in a Multiprocessor Test Language (MTL) format subject to constraints and enumeration controls in a test specification. An abstract system model of the machine under test is inputted to the Multiprocessor Test Generator. The Multiprocessor Test Generator (MPTG) receives the test specification and abstract system model, accesses a system specific database and generates test cases based on the constraints in the test specification in a Multiprocessor Test Language (MTL). The Multiprocessor Test Language (MTL) test cases are inputted to a Multiprocessor Test Executive (MPX) which controls the issuance of the test cases to a cache-coherent multiprocessor system, and monitors their completion in order to verify operation of the cache-coherent multiprocessor system.

14 Claims, 9 Drawing Sheets

METHOD AND APPARATUS FOR CREATING A MULTIPROCESSOR VERIFICATION ENVIRONMENT

FIELD OF THE INVENTION

The present invention relates to data processing systems, and more particularly, to an environment for exercising multiprocessor storage components.

BACKGROUND OF THE INVENTION

The verification of computer hardware designs have traditionally involved simulation models written in a hardware description language. The simulation models usually include one or more various subsystems, such as the central processing units (CPUs), cache controllers, memory controllers, and bus unit controllers (BUCs). Technology and architectural improvements enable larger and more complex systems, causing the time to verify designs to grow dramatically.

One prior art technique for design verification describes a software test environment for multiprocessor testing. A communication bus connects a plurality of slots into which a plurality of plug-in circuit boards may be inserted. Some slots may have non-intelligent data processing circuit boards (e.g., random access memory (RAM)), and others may contain intelligent data processing boards (e.g., Microprocessor boards). The data processing system is tested by having an intelligent data processing board execute a test program located on the non-intelligent data processing circuit board. Each non-intelligent data processing circuit board contains a diagnostic program written to test that particular non-intelligent data circuit. The test program is written in an intermediate level, interpretable test language. This test language is not tied to any particular processor's native test language. The intelligent data processing test circuit board all contain an interpreter program. The interpreter program enables the intelligent data processing circuit board to interpret and execute any test program written in the intermediate level interpretable test language. While the technique allows verification of hardware, it still requires implementation specifics for each CPU and requires the CPU hardware model for storage verification.

Another technique for design verification describes a test system for exhaustively testing sequences of bus transactions, and isolating a maximal set of functional processors. A multiprocessor system performs a cache coherency test that exercises cache coherency logic exhaustively, such that any cache coherency failures liable to occur will occur. The CPU(s) causing the failure is automatically identified by performing an automatic CPU sort. In particular, cache coherency is tested by causing each processor in the system to perform a sequence of read and write accesses to main memory, and to its own cache memory so as to cause substantially every possible sequence of cache coherency bus operations: Each processor tests consistency of data read by it, with data written by it. As long as no processor detects an error, read and write accesses are continued for a predetermined period of time. When a processor detects an error, the error is signaled on the bus; thereafter, at least one processor is disabled, and the read and write accesses are continued until a passing group of processors remain. While the technique discloses a procedure for testing cache coherency, the procedure is still implementation specific for each CPU and system, and requires a CPU hardware model for storage verification.

It is therefore desirable to have a method and apparatus for data processing system verification, which removes CPU hardware models from the system model, provides flexibility of system model content by allowing variations of levels of storage components and I/O adapters, and provides transaction level simulation for greater test coverage.

SUMMARY OF THE INVENTION

This invention relates to a method and apparatus for creating a multiprocessor verification environment. The environment allows the Central Processor Unit (CPU) to be bypassed/excluded to allow the data processing system's storage components to be efficiently exercised. Requests for testing system storage components are explicitly routed to the storage hierarchy mechanisms without utilizing the processor's fixed point unit, floating point unit and translation unit. A Multiprocessor Test Generator (MPTG) generates a set of test cases in a Multiprocessor Test Language (MTL) format subject to constraints and enumeration controls in a test specification. An abstract system model of the machine under test is inputted to the Multiprocessor Test Generator. The abstract system model consists of an interconnected set of coherence elements, a set of coherence element definitions, a protocol table conforming to a canonical form, a directory description of cache directory entries, a set of preloaded rules defining dependencies among the different levels of memory hierarchy, and definitions of the transactions passed among the caches. The test specification is created in a LISP- like language in which all statements are relations, which allows the user to specify a set of cache events for which to generate test cases. The Multiprocessor Test Generator (MPTG) receives the test specification and abstract system model, accesses a system specific database and generates test cases based on the constraints in the test specification in a Multiprocessor Test Language (MTL). The Multiprocessor Test Language (MTL) test cases specifies global parameter settings, initialization information for system memory hierarchy, processor transaction sequences, and final data values for the memory hierarchy units including the registers. The Multiprocessor Test Language (MTL) test cases are inputted to a Multiprocessor Test Executive (MPX) which controls the issuance of the test cases to a cache-coherent multiprocessor system and monitors their completion in order to verify operation of the cache-coherent multiprocessor system.

DETAILED DESCRIPTION OF THE EMBODIMENTS

This invention provides a method and apparatus for creating a multiprocessor transaction verification environment for allowing the bypassing and/or exclusion of the CPU when testing a system's storage hierarchy. The invention will be described more fully in the following drawings.

Figure 1:
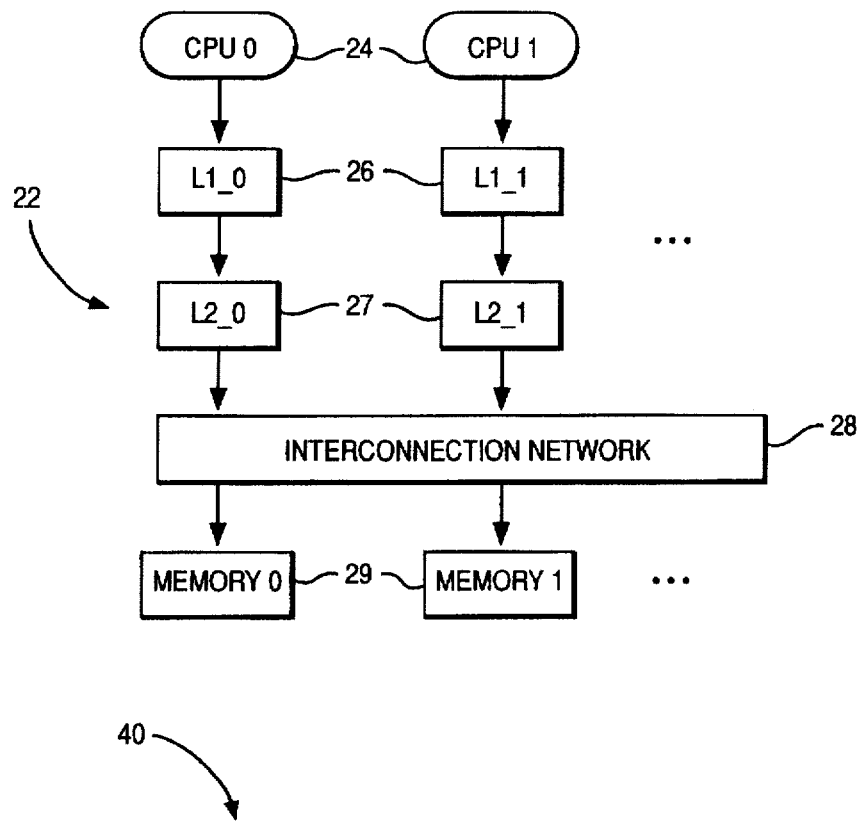
FIG. 1 is a block diagram of a cache-coherent shared memory multiprocessor capable of being tested by this invention.

Referring to FIG. 1, a typical cache coherent shared memory multiprocessor configuration 22, capable of being tested in a multiprocessor verification environment is shown. Multiple CPUs 24, access extremely fast random access memory which is shown as Level One caches (26) or Level Two caches for data or instructions. The Level One caches 26, and Level Two caches 27, are loaded from slower main memory 29, which is attached to the Level Two caches 27, by an interconnection network 28. The cache coherent shared memory multiprocessor configuration 22, is tested in the multiprocessor transaction verification environment by providing a test specification of the configuration 22, as input to a Multiprocessor Test Generator (MPTG). The MPTG generates a set of tests subject to the constraints and enumeration controls in the test specification.

Figure 3:
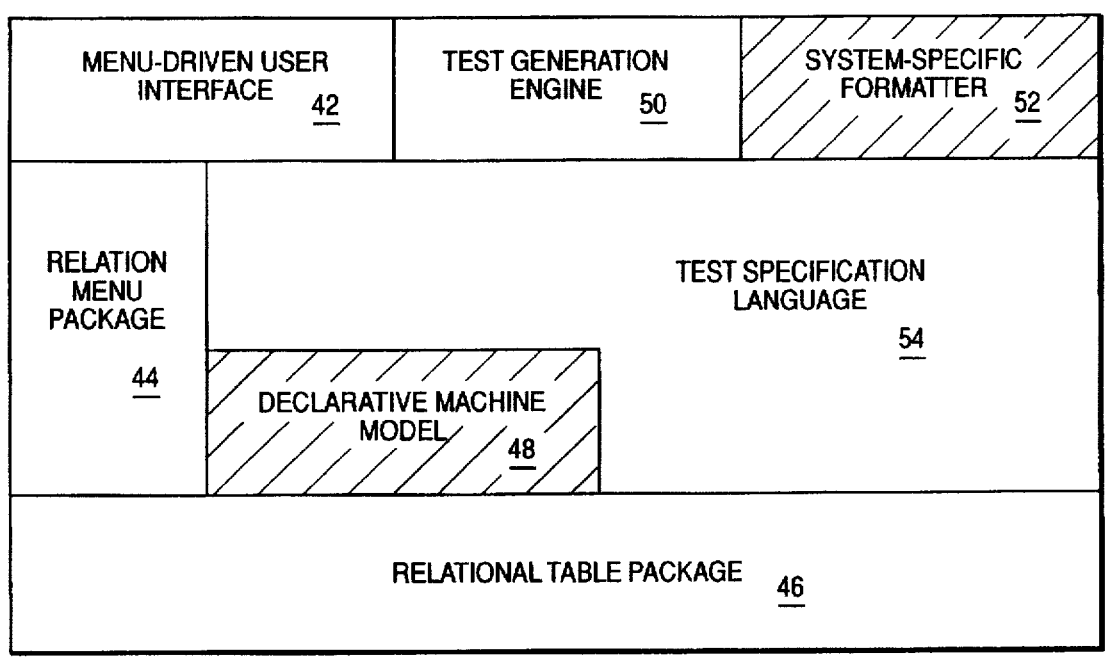
FIG. 3 is a block diagram of the major components of a multiprocessor transaction verification environment.
Figure 2:
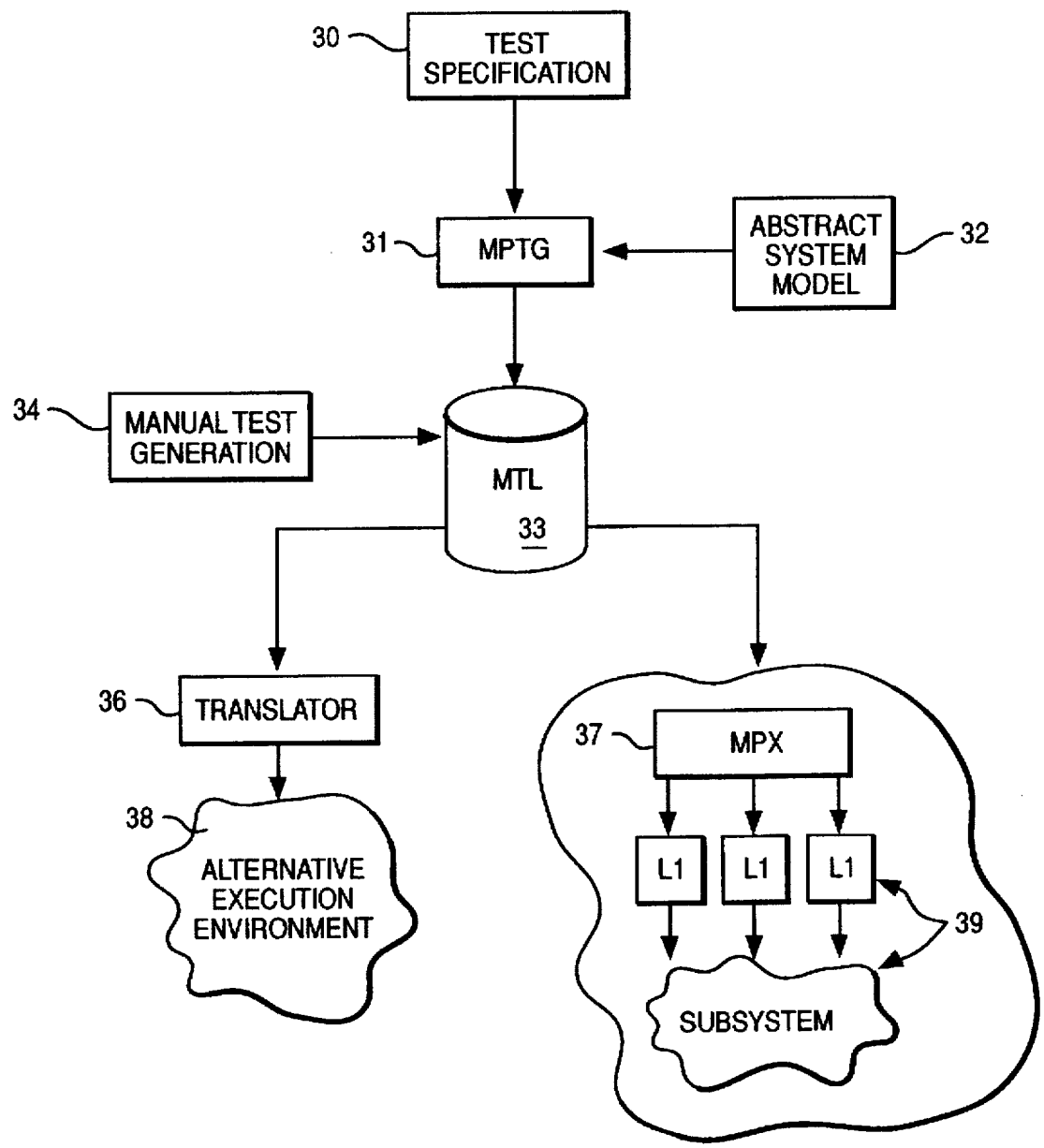
FIG. 2 is a block diagram of a multiprocessor transaction verification environment.

Referring now to FIG. 2, a high-level overview of the multiprocessor verification environment is shown. A test specification 30, is entered via a graphical user interface, or is written directly in a Multiprocessor Test Specification (MTS) language. The multiprocessor test generator (MPTG) 31, takes the test specification 30, and applies it to a system-specific abstract system model 32, to generate a set of test cases 33. Alternatively, manual test generation 34, may be created in the Multiprocessor Test Language (MTL) format 33. The test cases 33, are outputted to a Multiprocessor Test Executive (MPX) 37, which controls the issuance of transactions (requests) to a cache-coherence multiprocessor system 39, and monitors their completion. Alternatively, the test cases 33 in the MTL format, may be inputted to a translator 36, which may be used to test components in an alternative execution environment 38. One skilled in the art will appreciate that the alternative execution environment 38, may be the actual hardware implementation of the cache-coherent multiprocessor system. The abstract system model 32, includes protocol tables, and preload rules for all caches. The test specification 30, exploits this model to enumerate tests that cover various combinations of parameters in the protocol tables. The MPTG views the system as a set of uniprocessors that issue transactions into the memory subsystem. The first part is a set of traces of cache coherence transactions to be applied at each port into the memory hierarchy. The second part is the initial machine state for cache directories, pending transaction buffers and request queues. Some tests may have a third part which consist of the expected final state. The final state is specified only when it can be determined a priori. As appreciated by those skilled in the art, in some tests, the predicted final state cannot be predicted because of races among references to shared data. Turning now to FIG. 3, the major components of the Multiprocessor Test Generator (MPTG) 40, are shown. A system-specific database 52, contains an abstract model of the machine under test. A generic relational table package 46, provides a set of primitives for constructing and querying the abstract machine model. A generic test generation engine 50, takes the machine model and a test specification and generates a set of tests that satisfies the test specification. A generic, menu-driven, graphical users interface 42, similar to MOTIF is provided for writing test specification. The test specification language 54, is a LISP-like language in which all statements are relations. Each relation is a collection of tuples of symbolic information. Each tuple is called an entry in the relation. For example, a relation may have two fields as shown below:

```
(
    (field1:val1, field2:val2)
)
```

The contents of a cache directory can be represented in a relation as follows:

```
(
    (address: [0x00000012,0x00000112], state:shared)
)
```

In the above example, the relation has two fields, address and state. The address tag field contains 32-bit integer and the state field contains a symbolic value for the cache state. As can be seen, the address tag field has a collections of values, which allows a shorthand representation for both addresses being in the shared state. Portability is achieved in the MPTG by making the majority of its components generic. Only two components, the declarative machine model 48 and the system-specific formatter 52, are system specific. It will be appreciated by one skilled in the art that the creation of the declarative model 48 can be highly automated. The relational table package 46, is sufficiently generic that it can represent a wide variety of protocol tables, directory formats and test specification. Since these items form the bulk of the MPTG's data structures, little work is required to add new data structures when the MPTG is ported to a new machine. Additionally, the relation menu package 44, provides a facility for editing and displaying any relation structure supported by the table package, so no changes to the menu-driver user interface 42, are required when porting to a new machine. The use of a canonical table format, in combination with the table package, allows the test generator 50 to remain completely independent of the target system. Two feature of the relation package 44, make this possible. The first feature is that the type of each relation is included with each relation structure, so the test generator 50 never has to explicitly be aware of the exact transaction or directory formats. All queries and updates to the declarative model 48 are made anonymously. All that the test generator 50 requires is a standardized set of field names for the canonical protocol table. The second feature is that the set of primitives provided by the relation package 44 directly supports all of the query and relation-building features required for test generation (e.g., building a relation, finding the intersection of two relations, finding the union of two relations, finding the projection of a field with a relation). The test generator 50, described later in this specification, is required to query the protocol table and identity a subset of rows corresponding to a rowspec filter. Both the protocol table and the "rowspec" are relations of the same type. The query is performed by simply intersecting the "rowspec" relation with the protocol relation. This is done by calling an intersection routine provided by the relation package. The generation code passes two relation structures to the relation package and gets the resulting relation in return. All of the test generation steps can be formulated as similar generic operations. The declarative machine model 48, is the largest component and the largest component of it is protocol tables for the different caches. The MPTG 40, is capable of using existing versions of protocol tables that are extracted semi-automatically from existing documentation. This is possible when designers of caches, document coherence protocols using a format similar to the canonical form shown in Table B. One skilled in the art will appreciate that these documents can be parsed by a program that semi-automatically generates a table that can be read by the MPTG 40. The process is semi-automatic became a mapping file has to be written that identifies how the text in each cell of the input table is mapped into a piece of C code.

The basic building block of the Multiprocessor Test System is the event statement. The event statement allows the specification of a set of cache events or chains of cache events, for which to generate tests. The fields in the event statement are:

+ cache: The name of an instance of a cache at which the events or chains of events are targeted.
+ rowspec: A relation that identifies those rows of the protocol table (for the targeted cache) that are of interest.
+ enumfields: The fields of the rowspec relation that are to be exhaustively enumerated.
+ forward depth: The length of the chains of events in the forward direction that are to be enumerated.
+ backward depth: The length of the chains of events in the backward direction that are to be enumerated.
+ backward/forward filters: Lists of filter relations that are applied at caches along the chain of events in the forward and backward directions. The filter relation has three fields:
   cache: Name of an instance of a cache at which the events or chains of events are targeted.
   rowspec: Same as event statement.
   enumfields: Same as used in event statement.

Figure 4:
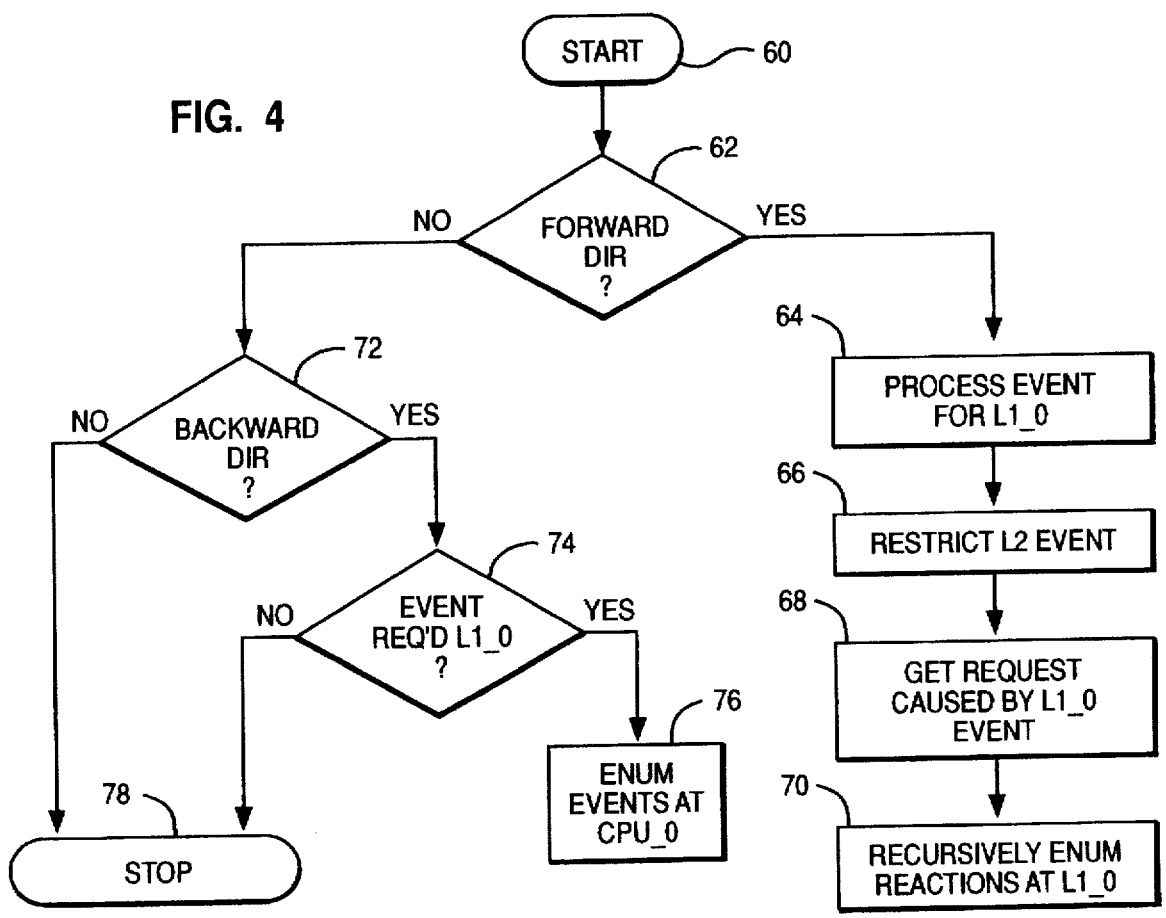
FIG. 4 is a flow diagram for event statement processing in the invention.

The event statement allows a user to enumerate a set of tests for exercising chains of events. An example is shown in TABLE C, for the system specified in TABLE B. As shown in TABLE C, the event specification begins by using L1_0 as a base, enumerating all chains of events that exercise rows of the L1 protocol table for incoming requests from CPU_0. The rows are then enumerated over all distinct transaction types and current-state pairs. Each chain of events is controlled as shown in FIG. 4. The procedure begins at block 60, and immediately moves to block 62, where the procedure determines if processing is in a forward direction. If YES, at block 64, the specified event for L1_0 is processed. The procedure causes subsequent events at L2 to be restricted by a forward filter as shown in block 66. At block 68, given a particular request from L1_0 caused by the L1_0 event, all reactions at L1_0 with distinct request type and current state pairs are recursively enumerated as shown in block 70. Returning to block 62, if the procedure is not processing in a forward direction, at block 72, a check is carried out to determine if processing is in a backward direction. If YES, at block 74, if a specified event is required at L1_0, the procedure enumerates all events at CPU_0 with distinct request type, and current state pairs that can cause the L1_0 event to happen as indicated in block 76. The events that occur at any caches that are not constrained by a forward or backward filter can be randomly selected. Many of the field names and values of event statements are dependent on the details of the protocol tables for each cache, which are system specific information input to the test generator.

The Multiprocessor Test Specification language provides a statement to specify flow control in the form of a loop statement. The loop statement allows a sequence of statements to be repeated a specified number of times. The fields in the loop statement are:

+ Name: the name of the loop.
+ min.max: specifies the range of values from which to randomly select the number of loop iterations.
+ statements: the body of the loop.

The form for the loop statement is shown below:

```
loop:(
    name: "loop1", min: 1, max: 10,
    statements:(
        statement 1
        statement 2
    )
)
```

The multiprocessor test specification language provides a technique for creating several parallel streams of independent events through a "fork" statement. The "fork" statement contains a "streams:" field which allows the specification of a list of parallel event streams. Each list element of streams is called a forkstream, and contains a list of statements. The "fork" statement takes the following form:

```
fork:(
    streams:(
        forkstream:(
            statement 1,
            statement 2,
        )
        forkstream: ( ... )
    )
)
```

In order to define a set of alternative event sequences, one of which is to be randomly selected at test generation time, the multiprocessor test specification language provides a "select" statement. The fields for the select statement are as follows:

+ streams: a list of alternative event streams.
+ selstream: Each list element of streams is called a selstream. The selstream has two fields:
   percent: the probability (as a percent) with which this stream is selected.
   statements: the list of statements for this alternative. The sum of the percent values over all alternatives must be 100.

An example of the select statement is shown below:

```
select:(
    streams:(
        selstream: ( percent: "20",
            statements: (
                statement 1,
                statement 2,
            )
            selstream:( percent: "30",
            . . . . .
            )
        )
    )
)
```

Macro support is provided by the MTS language in the form of the "marcodef" and "macroinst" statements. The "macrodef" statement is used to define a parameterized list of statements, that can be instantiated one or more times using a "macroinst" statement. The "macroinst" statements are used to instantiate a macro that was previously defined using the "macrodef" statement. The macrodef statements are relations with the following fields:

+ name (string): the name of the macro;
+ parameters (list of parameter relations): the parameters for the macro. Each parameter relation has three fields:

name (string): the name of the parameter.
type (string): the base field type of the parameter ("integer", "enum", "set", "list").
statements: the list of statements to be substituted wherever the macro is instantiated using the macroinst statement.

The macroinst statement has the following fields:

+ name (string): the name of the macro;
+ parameters (list of parameter relations): Each. parameter relation has two fields:
  name (string): the name of the parameter.
  value: the parameter value.

Figure 5:
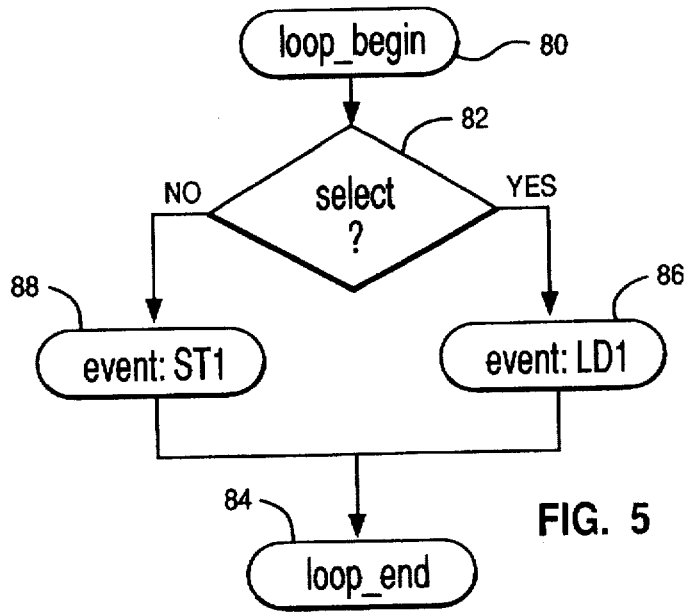
FIGS. 5 and 6 are flow diagrams of macro statement processing in the invention.
Figure 6:
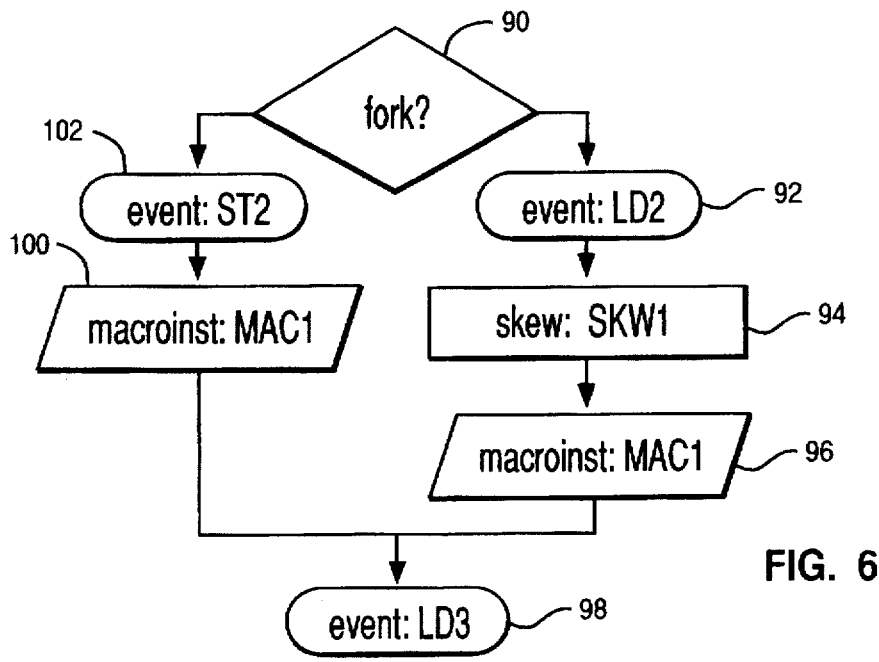

An example of the use of the "macrodef:" and "macroinst:" is shown in FIGS. 5 and 6, respectively. In FIG. 5, the "loop1" macro begins at block 80., and proceeds to a select at block 82. The select control statement in the loop causes the select statement to chose, based on percentage values, the store event (ST1) 88, or the load (LD1) event 86, for each iteration of the loop. Referring to FIG. 6, the macro diagram defines a set of parallel streams of events indicated by the fork statement at block 90. The store event (ST2) 102, appears in one event stream along with an instantiation of the "loop1" (FIG. 5) macro (MAC1) 100. The other stream of events contain a load event (LD2) 92, and a skew: statement 94, which is used to skew the time between event Load (LD2) 92, and the macro loop1 96, by an amount defined in the skew field. The macro definitions in the Multiprocessor Test Specification language allows the specification of N-way race states by manipulating address values and skew parameters for N processor systems. In addition, the macro definitions allow a flood of snoops request and/or cast outs to a cache element, and the ability to randomly insert cache events using the select function.

The MTS language provides a skew statement for generating a set of tests in which the delay between the last and the next statements is skewed over a range of values. The form for the skew statement is: skew: (start: 0, end: 1000, incr: 10).

The Multiprocessor Test Specification language provides an address construct which allows an address to be assigned a literal name. The address construct has the following form: alias: (name: "allfox", value: "0xFFFFFFFF"). The alias type construct allows a 32-bit address in the "value:" field to be assigned the literal string in the "name:" field.

The addrstream type allows an address to be partitioned into several components. The addrstream allows comprehensive address range coverage by allowing the user to individually manipulate the components from a test specification. The basic concept of the addrstream is to allow a user to define a name for it. The name represents a sequence of addresses which can be used in subsequent event statements to indicate a sequence of addresses from which to make a selection. The fields of the 'addrstream' are as follows:

+ name: the name of the stream;
+ tag: description of how the tag portion of the address is to be varied;
+ page: description of how the page portion of the address is to be varied;
+ class: description of how the class portion of the address is to be varied.
+ sector: description of how the sector potion of the address is to be varied.
+ byte_offset: description of how the byte offset portion of the address is to be varied.

Each address component of the address construct has two fields. A bit mask field specifies where the it lies in the address, and, another field which can be one of four types. The latter field type is similar to the UNION type in the C language. It can take on one of four predefined types. The four predefined types are:

fixed: address value is a constant

```
example ..... fixed:(
                value: 0x12345
            )
``` periodic: this component of the address will be given a sequence of periodic values with the specified start, end and stride values.

```
example ..... periodic:(
                start: 0x123456,
                end: 0x987654,
                stride: 0x100
            )
``` random: this component of the address will be given a sequence of selected values randomly selected within the start, end range and subject to the specified stride. It is possible for the same value to occur more than once in the sequence.

```
example ...... random:(
                start: 0x123456
                end: 0x987654,
                stride: 0x100
            )
``` distrandom: this component of the address is given a sequence value randomly selected within the start, end range and subject to the specified stride. The same value will never occur more than once in the sequence.

```
example ....... distrand:(
                start: 0x123456,
                end: 0x987654,
                stride: 0x100
            )
```

Figure 7:
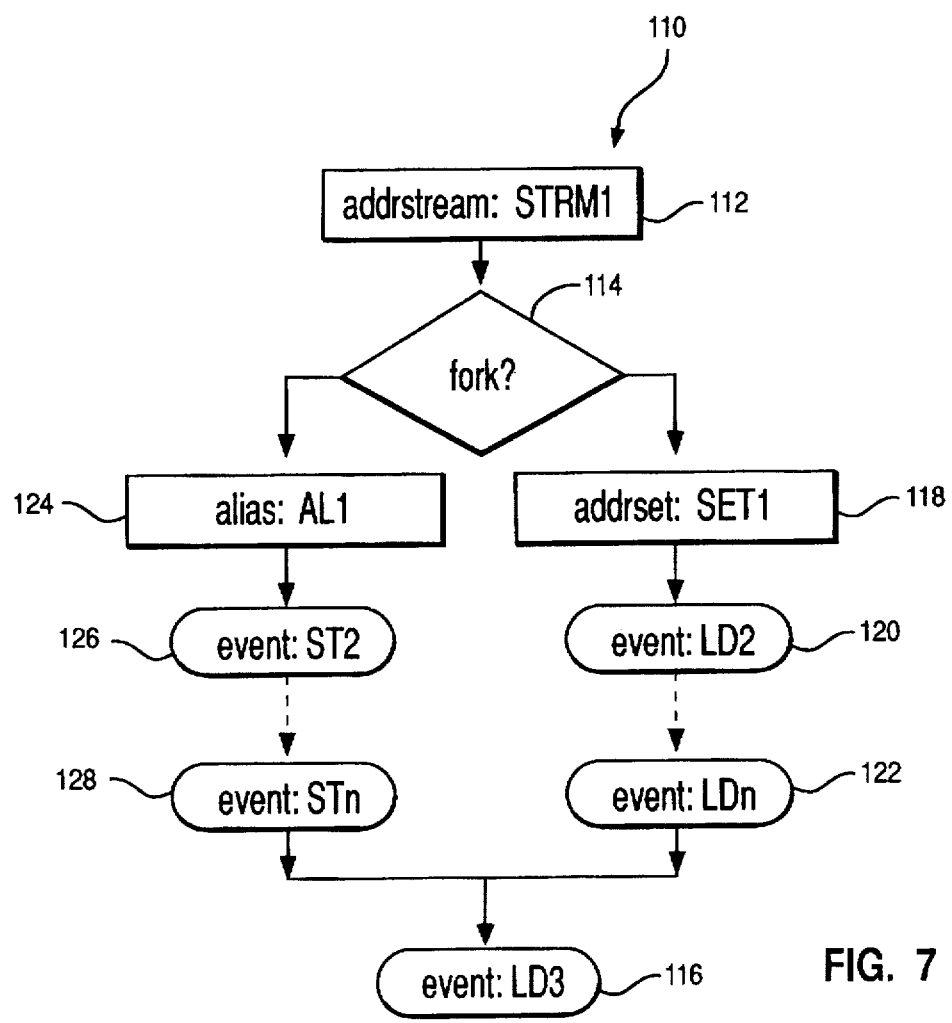
FIG. 7 is a flow diagram for addrstream statement processing using the invention.
Figure 8:
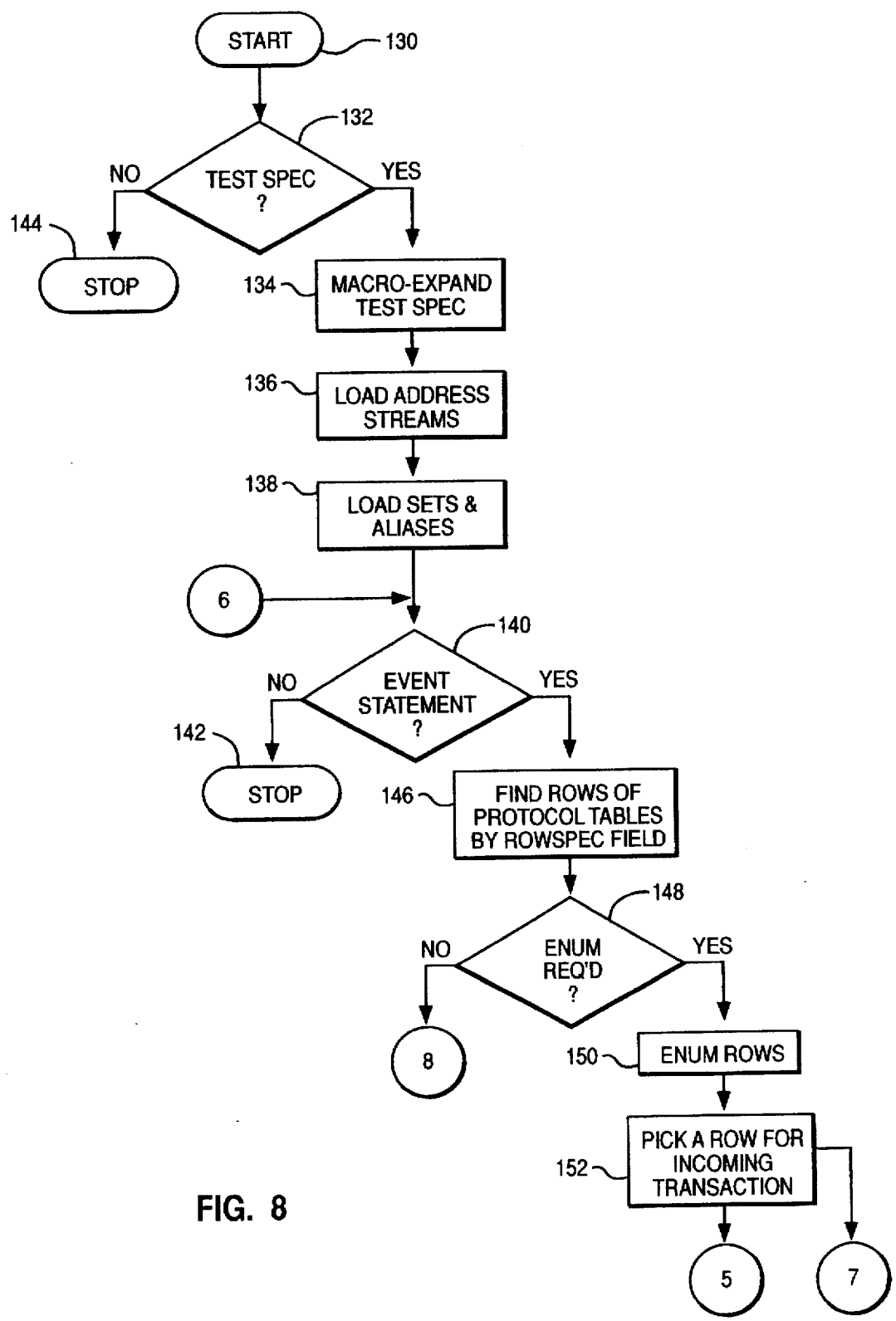
FIGS. 8–11 are flow diagrams for test generation using the invention.

An example of the addrstream type statement using the name, tag, page, and class field is shown in TABLE A. Referring to FIG. 7, an illustration of the use of the three types of address constructs is shown. FIG. 7 shows a test specification flow chart 110, which defines a macrodef block, ADDR1. The ADDR1 block 110, begins with the specification of the addrstream at block 112. A fork statement at block 114, defines a parallel set of events. This means that all the parallel events can use address values from the addrstream function. The left leg shows an alias specification (AL1) 124, for exercising a specific address value, along with store events ST2 126, and STn 128. The events in the right leg consisting of load event 2 (LD2) 120, load event N (LDn) 122, and Load event 3 (LD3) can use the addrset type 118, to select one of the addresses from a defined set.

TABLE A

```
addrstream:(
    name:   "addr_increment",
    tag:    (
            bit_mask: 0xfff00000,
            random: (start: 0x00000000, end:
                    0xfff00000, stride: 0x1,
            )
    page:   (
            bit_mask: 0x000ff000,
            periodic: (start: 0x00000000, end:
                    0x000ff000, stride: 0x40),
            )
    class:  (
            bit_mask: 0x00000f00,
            distrand: (start: 0x00000000, end:
                    0x00000f00, stride: 0x1),
            )
    sector: (
            bit_mask:0x000000c0,
            fixed: (value: 0x00000000),
            )
    byte:   (
            bit_mask: 0x0000002f,
            random: (start: 0x00000000,
                    end: 0x0000002f, stride: 0x1),
```

Finally, the address construct for the Multiprocessor Test Specification provides the capability of naming a group of addresses as a set. This function is provided by the addrset statement, which allows a named set of addresses to be used in subsequent event statements to indicate a collection of addresses from which to make a random selection. The fields for the addrset statement is given below:

+ name: name of set.
+ value: address or collection of addresses to add to the set. The value field can be one of the following:
  A literal address(e.g., "0xdeadbeef")
  The name of an existing set, the entire contents of which are added to this set.
  The name of an address stream, the entire contents of which are added to this set.
  The name of an address alias is to be added to this set.

An example of the addrset statement is given below:

```
addrset: (
    name: "set1",
    value: "0xdeadbeef", "0xff234d44"
)
```

The Multiprocessor Test Generator (MPTG) generates tests for the abstract model of the machine under test, such as the cache coherent shared memory multiprocessor configuration 22, shown in FIG. 1. The abstract model may consists of 1) an interconnected set of coherence elements where each coherence element is an instance of a coherence definition. Processors or I/O drivers are modelled as degenerate coherence elements that can issue transactions without receiving a transaction from some other coherence element first. The coherence element definitions have two parts. The first part is a protocol table which conforms to a canonical form. The second part is a directory description which defines the format of the cache directory entries and the organization of the cache (e.g., set associativity, number of congruence classes, etc.). The abstract machine model also consists of a set of preloaded rules that define the dependencies among the different levels of the memory hierarchy. In addition., the abstract machine model must contain definitions of the transaction types that are passed among the caches. The format of a typical protocol table is shown in Table B. The canonical table format requires that all tables include all of the columns shown in the table.

TABLE B

| Incoming Transaction | Source | Current State | Request Type | Destination | New State |
|---|---|---|---|---|---|
| L1 Coherence Protocol Table | | | | | |
| Load Miss | CPU | Invalid | Load Miss | L-2 | Shared |
| Store Miss | L-2 | Shared | None | None | Invalid |
| L2 Coherence Protocol Table | | | | | |
| Load Miss | L-1 | Invalid | Load Miss | Memory | Shared |
| Store Miss | System Bus | Shared | Store Miss | L-1 | Invalid |

Table B describes an abstract state machine that specifies what the coherence element must do for all possible incoming transactions for all possible states of the referenced cache line. For each particular transaction/state combination, the cache may issue one or more intermediate transactions to other caches, and may change the state of the referenced cache line. The cache must also issue a reply to the cache that sent the incoming transaction.

Figure 9:
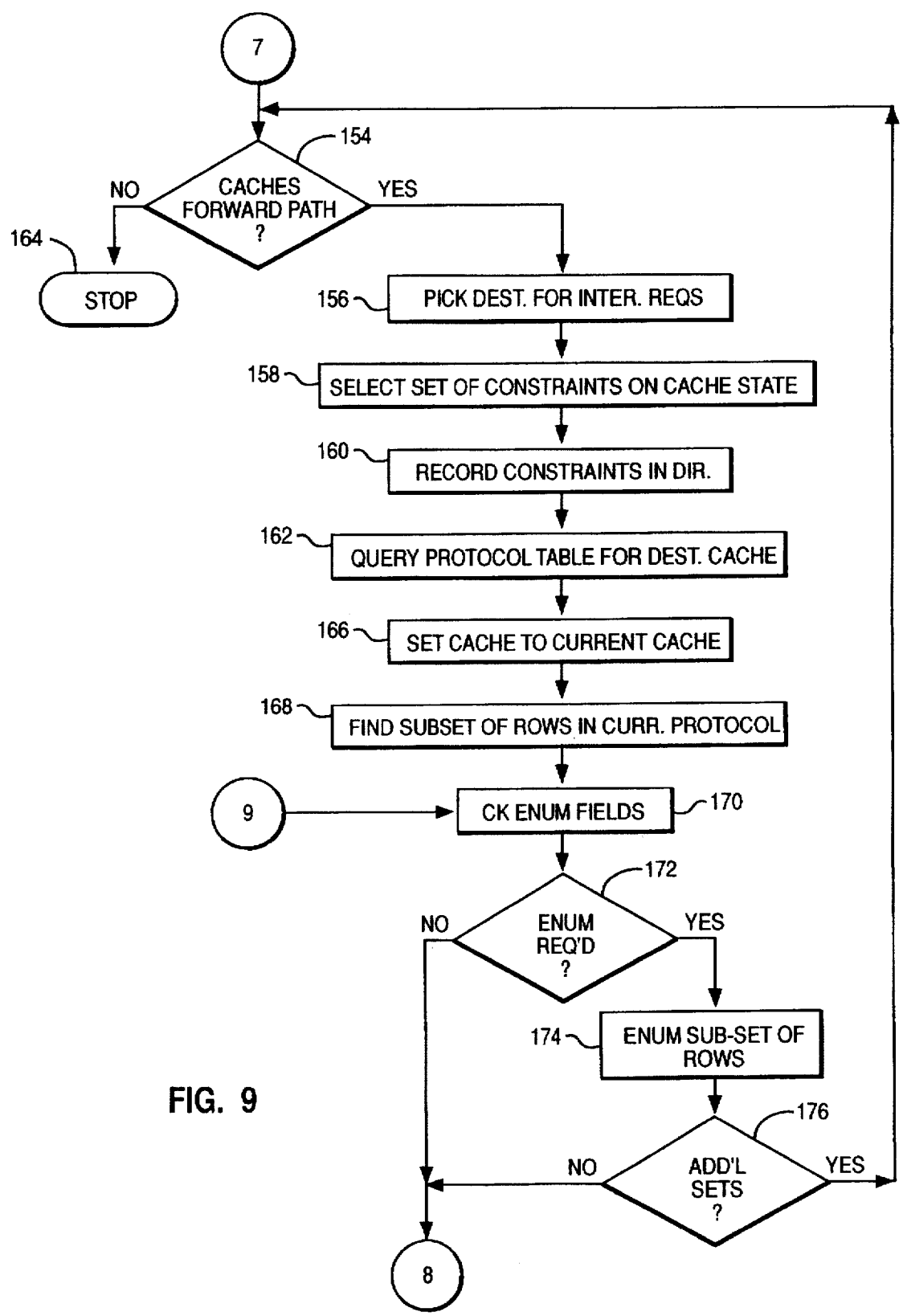
Figure 10:
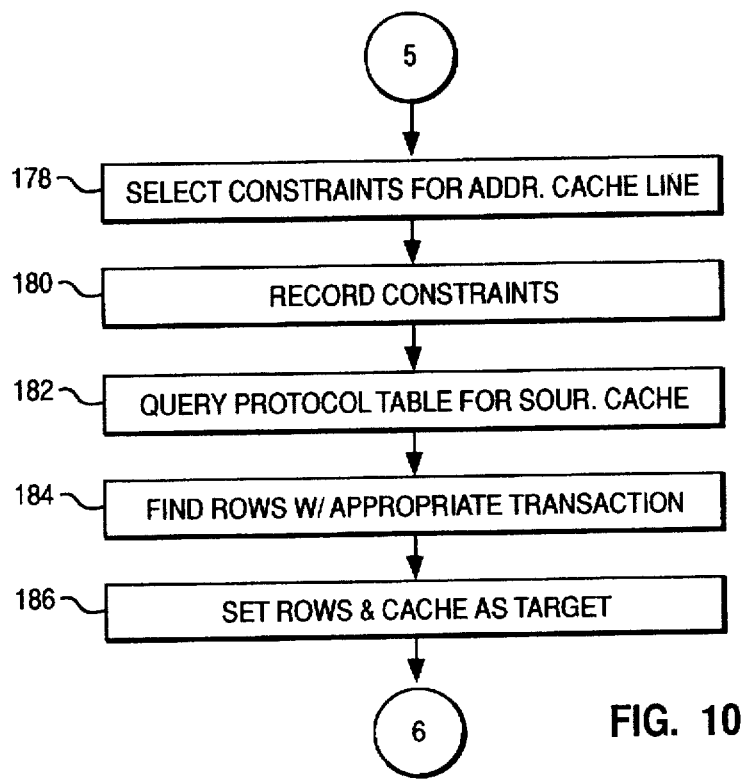
Figure 11:
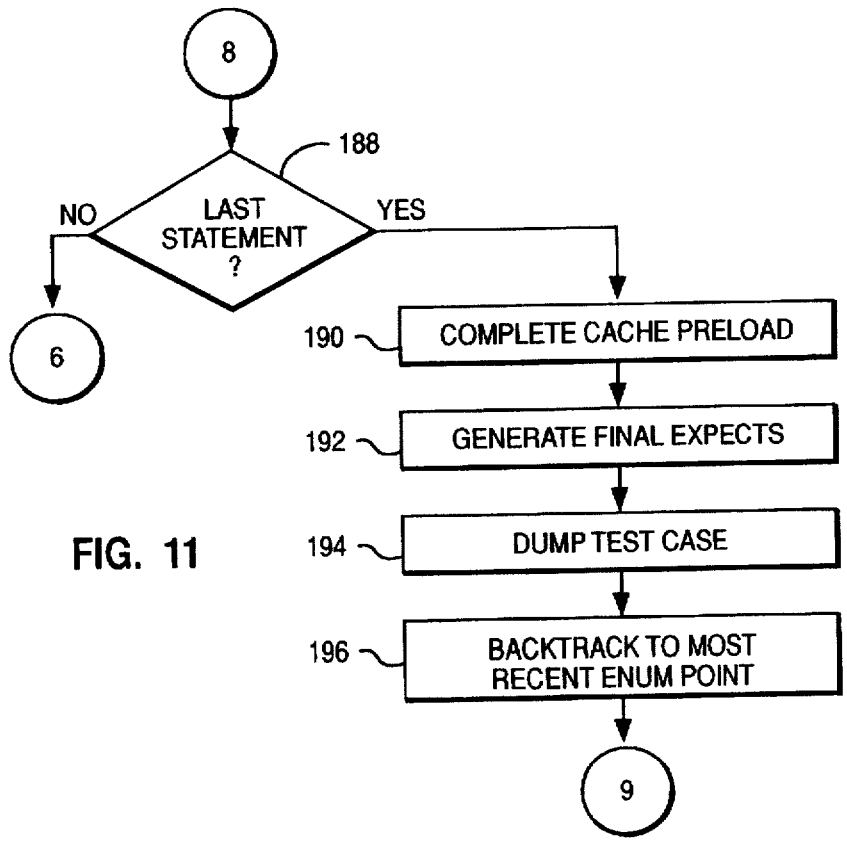

Referring now to FIGS. 8–11, the Multiprocessor Test Generator (MPTG) generates tests for a test specification using the illustrated procedure. At block 130, the procedure starts an proceeds immediately to block 132, where a check is initiated to determine if a test specification exist. If NO, the procedure terminates at block 144. Else, at block 134, the procedure macro-expands the test specification and loads the address streams at block 136, and loads the sets and aliases at block 136. This involves unrolling loops, randomly selecting paths in each select statement, and expanding all macroinst. The only types of statement that are not macro expanded are fork and event statements. At block 140, the procedure determines if an event statement exist. If NO, at block 142, the procedure terminates. Else, at block 146,, for each event statement, the procedure recursively setup caches along paths back to a processor or I/O driver. The procedure finds the subset of rows of the targeted protocol table constrained by the rowspec field of the event statement or back filter (if one has been specified). At block 148, the procedure determines if enumeration is required on the subset of rows. If YES, at block 150, the procedure enumerates all sets of the rows for which tests will be required. Enumeration is specified in the enumfields of the event statement, or in a back filter if one has been specified. At block 152, from each set of enumerated rows, the procedure randomly picks a source for the incoming transaction. Also at block 178 (FIG. 10), the procedure randomly selects a suitable set of constraints on the current state for the addressed cache line. Still referring to FIG. 10, the procedure records the constraints in the current copy of the cache directories as shown in block 180. At block 182, the procedure queries the protocol table for the source cache, and finds all rows in which the appropriate transaction is issued to the targeted cache as shown in block 184., At block 186, the procedure sets the rows and this cache as the targeted cache. The procedure then returns to block 140 (FIG. 8), to repeat the procedure for the next event statement. Returning to block 152 (FIG. 8), while setting up the caches along the path back to a processor or I/O driver, the procedure attempts to recursively setup caches along the forward path as shown in block 154 (FIG. 9). If no setup is required in the forward path, the procedure ends at block 164. Else, at block 156, the procedure randomly picks a destination for the sequence of intermediate requests, and randomly selects any additional set of constraints on the current cache state imposed by the destination as shown in block 158. At block 160, the procedure records the constraints in the current copy of the cache directories. The procedure queries the protocol tables for the destination cache for each of the intermediate request at block 162, and finds all rows for an appropriate incoming transaction from the current cache. At block 166, the procedure sets the cache to the current cache. The procedure then finds the subset of rows of the current protocol table constrained by the rowspec field of the forward filter, if one has been specified. At block 170, the procedure checks the enumfields to determine if enumeration is required as shown in block 172. If YES, the procedure enumerates all sets of the rows for which tests will be required as shown in block 174. At block 176, the procedure checks for additional sets of rows needing enumeration and returns to block 154, to process the additional sets. If no rows need enumeration, processing proceeds to block 188 (FIG. 11), where the procedure checks to see if there is an additional event statement. Still referring to FIG. 11, if the last event statement in the expanded test specification has been processed, at block 190, the procedure completes cache preloading. This is required because the test generation routine constrains the directory states as little as possible. For example, a particular cache event may occur for two or more directory states (e.g., such as "modified" or "shared"). Before the test is dumped, one of the possible states must be selected. Preloading consists of performing the following steps by, working from the highest level (e.g., main memory) to the lowest level (e.g., L_1), for each level of memory:

Step 1: Randomly select one of the possible states for all reference lines.

Step 2: Look up the preload rules to determine the extra constraint imposed by this selection on all lower level caches that are dependent on (included in) this level.

The above technique assumes that inclusion holds for all caches because the contents of the caches at a particular level are included in the caches at the next higher level, and that there are no cyclic dependencies among any set of caches. Returning to FIG. 11, at block 192, the procedure generates the final expects for all addressed bytes that are referenced by only one processor or I/O driver. In general, final expects cannot be generated for bytes that are affected by synchronization operations or cache invalidations. At block 194, the procedure dumps the test cases and the procedure backtracks to the most recent enumeration point. One skilled in the art will appreciated that it is possible for a test-specification to require enumeration in several event statements. Within a single event statement, it is possible to specify enumeration at each step in the chain of events leading up to a cache event and resulting from the cache event. At each of these enumeration points, the current set of constraints on the entire memory hierarchy must be copied to permit backtracking.

TABLE C

```
(
    cache: "L1_0",
    rowspec:
        (
            tran: "Load Miss",
            source: (type: "L1"),
```

TABLE C-continued

```
            enumfields: (fieldnames: {"request type",
                "current state"}),
    fwddepth: 1,
    fwdfilters: (
        L2Filters: (
            cache: "L2_0",
            rowspec: (
                source: (type: "L1")
            ),
        )
        backdepth: 1,
        backfilters: (
            CPUFilter: (
                cache: "CPU_0",
                rowspec: (
                    source: (type: "Execution Unit")
                ),
                enumfields: (field: "request type"),
            ),
        )
    )
```

Figure 12:
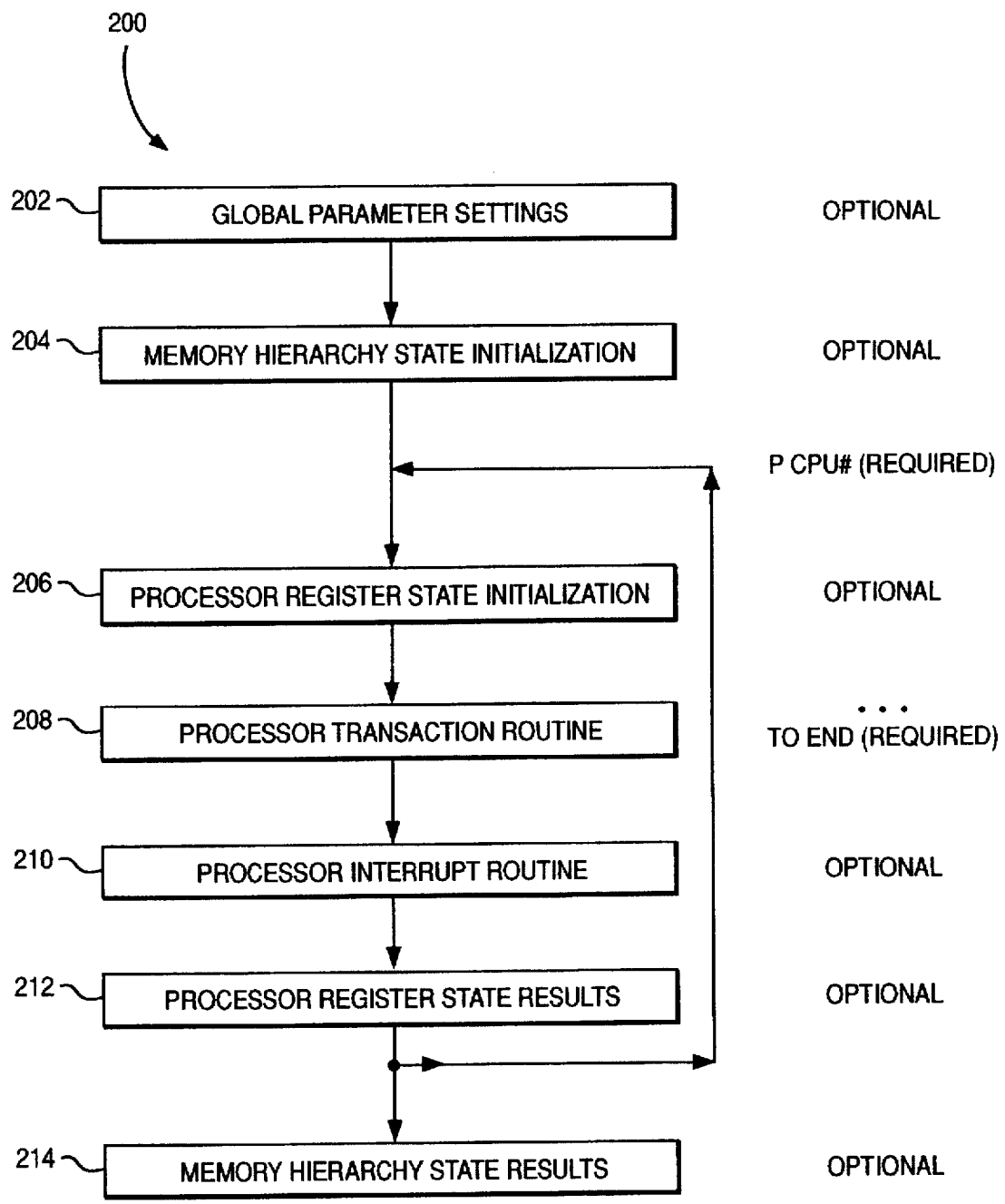
FIG. 12 is the organization of a test case written in a Multiprocessor Test Language (MTS).

Referring now to FIG. 12, there is shown a block diagram of the flow for a test case 200, in the Multiprocessor Test Language (MTL). The test case will specify any global parameter settings 202, initialization information for the memory hierarchy 204, processor initialization 206, processor transaction sequences 208, processor interrupt routine 210, processor register results 212, and memory hierarchy results 214. The expected flow of test cases as well as the details of each component that makes up a test case will be described. The MTL test case 200, consists of an ASCII file with each line containing one entry. There are six entry types defined, each with its own format which provides specific information. Any text on the line after the specified information is ignored and is assumed to be a comment. The information provided on each line is parsed with valid delimiting characters consisting of space, tab, comma, '[' and ']'. If a problem is detected while reading the test case an error message will be printed and the test case will abort execution. Each line in the test case file should begin with a capitol letter that uniquely defines the entry that is given on that line. Each entry type has a defined meaning, that can vary slightly based on the context of the entry within the test case file (e.g., the current section).

Global parameters 202, include the number of processors, seeds for any random number streams, the maximum number of simulation cycles, etc. Then the initial state of the memory hierarchy (both the directory state and data state) is also specified. The MPX makes calls to external preloaders to initialize the caches and the memory. The sequence of transactions to be executed for each processor is then listed, a contiguous sequence for each processor. One skilled in the art will appreciate that the sequence may be unique per processor. Each transaction may be specified to be issued at a specific relative time with respect to the previous transaction issued by the same processor, the relative time delay may be a non-negative number that is either specified in the test case or generated during the run time by the MPX. The relative time delays between successive transactions may not always hold true during a simulation run due to run time data dependencies. At the end of the test case, the user may specify the final expected coherence state of the system. The system state may include the register contents, cache and memory contents for specific cache blocks, and the final coherence state of specific cache blocks. It should be emphasized that the specification of the MTL allows several different processor instruction sets to be simulated. In particular, the types of transactions that the MPX may issue include all system transactions that arise. All register load instructions (of different data sizes) are combined into a single generic D-Cache Load transaction that specifies the size of the datum to be loaded into a register. The other instructions include D-cache stores, D-cache operations such as invalidate, TLB operations, I-cache operations, and synchronization operations, among others.

A unique feature of the MTL is a "barrier" operation. In a test case, the user may initialize a barrier and indicate which processor takes part in the barrier operation. When one of the participating processors reaches the barrier, the MPX checks if all processors have arrived. If not, it stops issuing new transactions to the processor. When the other processors reach the barrier, the MPX releases all processors from the barrier and continues with the issuance of new transactions. A processor may participate in more than one barrier simultaneously. The barrier function allows the test generator to precisely control the introduction of race conditions into the multiprocessor system. When not present, architecture specific synchronization instructions are required.

The allowable entry types for MTL test cases are:

<text> Indicates a comment line. A blink line or a space character will have the same effect.

H<test case number> Indicates the start of a test case in a multiple test case file. A number should be given that indicates the test case index within the file (e.g., convention has the index starting at 1000, 1001, . . .). Each test case must be valid and is run independently. If no H entry is given, the MPX runs normally as if only one test case is in the file.

G<parameter information> Indicates a setting for a predefined global parameter will be given. The parameters and any relevant information should follow, separated by spaces.

P[CPU|BUC]<#> Indicates which CPU information will follow. The <#>, which should be substituted with a non-negative integer, indicates to which processor the following test case information should apply. The entries that follow apply to the specified processor until another P entry, some memory hierarchy state information, or the end of a test case file is encountered. It is assumed that only P entry will be given for each valid processor defined in the system being tested, or an error message is generated and the test case will abort execution.

S[<instance>]<state><values>Indicates some state information for either initialization or results checking, dependent on test case context. For memory hierarchy, the instance name is supplied along with the state name and state value. The instance name is not needed for any processor state became that information is provided by the P entry context. For consistency, the instance names should conform to the following convention: <instance>=<facility>_<#> where <facility> would likely be in the set {L1,L2,L3}, and <#> is a non-negative integer in the range of 0 to n−1, where n is the actual number of instances of the facility.

T<delay>< transaction specific information> Indicates the specified transaction to be issued after <delay>, unless some other restriction/dependency prevents its issuance. Delays can be specified in three formats: constants, random and programmable. Constant delays are specified by a non-negative integer. Random delays are generated at execution time. The format for a random delay is R[S#,#], where S# is the random stream number and # represents the mean value (positive integer) for an exponential distribution. Programmable delays are given by specifying a general purpose register, with the format GPR[x]. These three methods for specifying delays should be useful for cases where a test case wants to execute loops and vary the skew with which transactions are issued at run time. The transaction specific information for all recognized transactions is documented below. A group of transactions make up a routine. Each processor has a main routine and optionally a routine for each system defined interrupt. In order to complete cleanly and deterministically, each routine must issue an END transaction as its final transaction. An END transaction causes a wait for the dependency table to empty before checking any resultant information.

M<T bit>0><64-bit address>0x<64-bit data> This entry is used to initialize the shadow memory for both T=0 and T=1 (I/O) to be consistent with the memory hierarchy state initialization done with the S entries. It is up to the test case writer to ensure consistency.

The MTL (Multiprocessor Test Language) provide global parameters 202, in the following format:

G MAX_CYCLES<#> This parameter sets the maximum number of cycles that a test case will execute. The number given is relative to the current clock. The default for MAX_CYCLES is 2147483647. When the simulation time reaches this set maximum, the test case is considered complete.

G SHADOW_MEM [0|1] This parameter activates shadow memory mode. While in shadow memory mode a mirrored image of the memory contents based on the transactions issued during the execution is maintained. This allows calculation of the expected values of loads (not in the presence of races, or true sharing). A distinction between T=0 and T=1 (I/O) space is made. The data returned from loads will be checked against the value maintained in the shadow memory. If the expected value does not match the actual value, a warning message is printed. The additional operand 0|1 is provided to put shadow memory in either warning (0) or fatal (1). When in fatal mode, the test case terminates upon a mismatch. The default is warning mode.

G PROCESSOR<#> This parameter indicates the number of processor present in the system being tested.

G RAND_SEED <stream><#> This parameter initializes the random number stream<stream> with the seed <#>. Sixteen independent random number streams can be used for random delays and assigning random values to general purpose registers. If this parameter is not given for a stream, a random seed of 0 is the default. The independent random streams provide a powerful mechanism to vary the time delay, address, data and transaction mix in a dynamic manner.

The MTL provides a stand-alone mode which allows test cases to be run without any other models in the system. In stand-alone mode, the shadow memory is used to simulate the rest of the system. When operating in this mode, all transactions including loads and store resolve in zero cycles, although delay cycles still apply in the normal fashion. The transactions that are not loaded or stored take no time, but also have little meaning in this model. The utility of this mode is that it can be used to debug test cases in a stand-alone environment. If the test case does not contain any true sharing, the results generated will also be correct. If the test case contains true sharing, the result will be correct but may not match all implementations because the races may be resolved differently.

The set of valid transactions that comprise a test case 200 will now be described. It should be understood that each transaction appears in a test case file as in the previously described, T<delay><transaction specific information> entry type. The <delay> field represents the relative delay from the last transaction issued. Delays can be specified in three formats: constants, random and programmable. Constant delays are specified by a nonnegative integer. Random (dynamic) delays are generated at execution time. The format for a random delay is R[S#,#], where S# is the random stream number, and # represents the mean value (positive integer) for an exponential distribution. Programmable delays are given by specifying a general purpose register, with the format GPR[x]. These three methods for specifying delays should be useful for cases where a test case wants to execute loops and vary the skew with which transactions are issued at run time. The transaction specific information for all recognized transactions is documented below. The transactions are divided into three categories: processor, BUC and directives. The processor transactions are transactions that initiate requests to the memory hierarchy. The BUC transaction are specific to bus adapters. The directives are provided to give an assembly language like programming model ability for issuing processor and BUC transactions. The following restrictions, beyond the normal delay cycles, apply to processor initiated transactions:

ADDRESS/DATA ALIGNMENT This restriction stipulates that for all variations of loads and stores, the combinations of the size and address must not cross a 64 bit (e.g., 8 byte, double word) boundary. For example, a load (or store) of size 8 must give an address on a double word boundary, a load (or store) of size 3 must give an address within the first 5 bytes of a double word. If this is violated, an error message is printed and the test case aborts execution.

MAXIMUM OUTSTANDING TRANSACTIONS (DEPENDENCY TABLE) Specifies the limit for the number of outstanding transactions per processor. These transactions are issued to the interface behavioral who can enforce system dependent restrictions, such as load-store ordering, or more restrictive outstanding transaction requirements.

ONE OUTSTANDING PIO LOAD/STORE—Limits the number of outstanding PIO (Programmed I/O) transactions per processor to one.

TRANSACTIONS ISSUED PER CYCLE—Restricts the one transaction per interface port per cycle. This means that only one D-Cache and one I-Cache request may be issued per cycle, even if the transaction specified delay is zero (and there will not be notification to the user of this occurrence).

REGISTER DEPENDENCIES—Imposes restrictions on the issuance of transactions, if there is a dependency on the contents of an MPX processor register. For example, if a load to GPR[1] has not completed, a store from GPR[1] can not be issued and the issuance of transactions will stall until the dependency is met. The notation for the arguments of each transaction are:

WIM This argument provides the WIM bits for the specified transaction. The value is given in decimal or hexadecimal (0x#) format. The valid range is 0–7. Invalid WIM combinations are not detected.

Size This argument provides the size in bytes of the specified transaction. The value is given in decimal or hexadecimal (0x#) format. The valid range is 1–8.

GPR[x],IPR[x] This specifies a general purpose and instruction registers, respectively. The value x specifies which register is effected by the transaction.

Op1,Op2 This argument operand can be either a general purpose register (GPR[x]) or a 64 bit immediate value. Immediate values are given in hexadecimal format (0x#).

TABLE D

| TRAN | ARGUMENTS | DESCRIPTION |
|---|---|---|
| PROCESSOR TRANSACTIONS | | |
| ICLD | WIM Size IPR[x]Op2 | I-Cache Load, loads IPR[x] from address Op2 |
| DCLD | WIM Size GPR[x]Op2 | D-Cache Load,loads GPR[x] from address Op2 |
| DCST | Wim Size Op1 Op2 | D-Cache Store,stores value Op1 a address Op2 |
| IOLDI | Size GPR[x]Op2 | PIO Load Immediate,loads GPR[x] from address Op2 from T=1 Memory |
| IOLDL | Size GPR[x]Op2 | PIO Load Last,loads GPR[x] from address Op2 from T=1 Memory |
| IOSTI | Size Op1 Op2 | PIO Store Immediate,stores value Op1 at address Op2 in T=1 Memory |
| IOSTL | Size Op1 Op2 | PIO Store Last,stores value Op1 at address Op2 in T=1 Memory |
| LARX | WIM Size GPR[x]Op2 | Load & Reserve Indexed (LWARX, LDARX),loads GPR[x] from add Op2 |
| STCX | WIM Size Op1 Op2 | Store Conditional Indexed (STWCX STDCX),store value Op1 at add Op |
| EIEIO | | Synchronize I/O |
| SYNC | | Synchronize (SYNC,VSYNC) |
| TLBSY | | TLB Synchronize |
| TLBIN | Op1 | TLB Invalidate(TLBIE,TLBIA, TLBIEX) to address at Op1 |
| DCBZ | WIM Op1 | D-Cache Block Zero at add Op1 |
| DCBT | WIM Op1 | D-Cache Block Touch at add Op1 |
| DCBTST | WIM Op1 | D-Cache Block Touch for Store at address Op1 |
| DCBST | WIM Op1 | D-Cache Block Store at add Op1 |
| DCBF | WIM Op1 | D-Cache Block Flush at add Op1 |
| DCBI | WIM Op1 | D-Cache Block Invalidate at Op1 |
| ICBI | WIM Op1 | I-Cache Block Invalidate at Op1 |
| TRANSACTION FOR BUCS | | |
| RETRY | # | Instructs BUC to retry next # bus transactions |
| DIRECTIVES TO CONTROL MPX TRANSACTIONS | | |
| B | label | Branch Unconditional |
| BLT | label | Branch Conditional (less than) |
| BLE | label | Branch Conditional (less than or equal) |
| BEQ | label | Branch Conditional (equal) |
| BGT | label | Branch Conditional (>) |
| BNL | label | Branch Conditional (not <) |
| BNE | label | Branch Conditional (not =) |
| BNG | label | Branch Conditional (not >) |
| CMP | GPR[x]Op2 | Set CR based on GPR [x] -Op2 |
| ADD | GPR[r]GPR[x]Op2 | GPR[r]=GPR[x]+Op2,& set CR |
| SUB | GPR[r]GPR[x]Op2 | GPR[r]=Op2-GPR[x], & set CR |
| AND | GPR[r]GPR[x]Op2 | GPR[r]=GPR & Op2, & set CR |
| OR | GPR[r]GPR[x]Op2 | GPR[r]=GPR[x] or Op2,& set CR |
| XOR | GPR[r]GPR[x]Op2 | GPR[r]=GPR[x] xor Op2,& set CR |
| SHL | GPR[r]GPR[x]Op2 | GPR[r]=GPR[x] shifted left Op2 bits, and set CR. |
| SHR | GPR[r]GPR[x]Op2 | GPR[r]=GPR[x] shifted rt Op2 bits, and set CR. |
| RAND | S#GPR[x] | Use random stream specified by S# to generate 64 bit val in GPR [x] |
| BAR INIT | B#P# | Barrier Init, Set barrier num(B#) |
| BARRI | B# | Stall transaction issue |
| LABEL | label | Name transaction as branch dest. |
| DISP | Text | Display Textual Message |
| ECHO | Register | Display processor register |
| END | | Finish transaction stream |
| HALT | | Terminate test case |

The test cases use the S entries to initialize and results check state within the system model. There are two separate kinds of states. The processor state consists of a defined set of registers. There is also the memory hierarchy or system state. The following registers are used within each processor:

CR Condition register 32 bits in length where the most significant 4 bits are: LT, GT, EQ, SO (e.g., S CR 0x 200000000, set the EQ bit).

GPR[0–31] Fixed point general purpose registers of 64-bits which uses fixed-point arithmetic and addressing. It is up to the test case to restrict its contents to 32-bits if the system requires. (e.g., S GPR[0]0x 0, set general purpose register number 0 to value 0).

IPR[0–31] Instruction Purpose Registers of 64 bits, used as the destination for I-Cache loads. They are provided to due data checking form the I-Cache. (e.g., S IPR[0]0x F000A01B010C0C0, set instruction register number 0 to the given value).

The Multiprocessor Test Executive 37 (FIG. 2), controls the issuance of test cases (e.g., transactions) to the cache-coherent multiprocessor system 39, and monitors their completion. The transactions focus on components of the storage hierarchy, such as cache controllers, memory controllers, and input/output adapters. The MPX assumes the role of processors in the system being simulated. The MPX is a C behavioral that executes, instead of machine instructions, a set of transactions specified in the Multiprocessor Test Language 33. MPX is independent of any specific machine implementation and works for bus-based snoopy protocol cache-coherent systems as well as directory based coherency protocol implementations. Requests such as loads and stores are issued from the MPX to the subsystem 39, with a set of appropriate parameters (See TABLE D). The MPX makes explicit requests which eliminates a level of indirection that the CPU hardware introduces. This decreases the complexity of the verification process. For each processor, the MPX maintains the state of the "processor", including registers, transaction routines and transaction dependency tables. The register state and transaction routines are maintained independent of the memory hierarchy. The MPX initializes and checks the coherence state of the cache block within the subsystem. A shadow memory is maintained which can predict and check the results of loads except in the presence of races.

Figure 13:
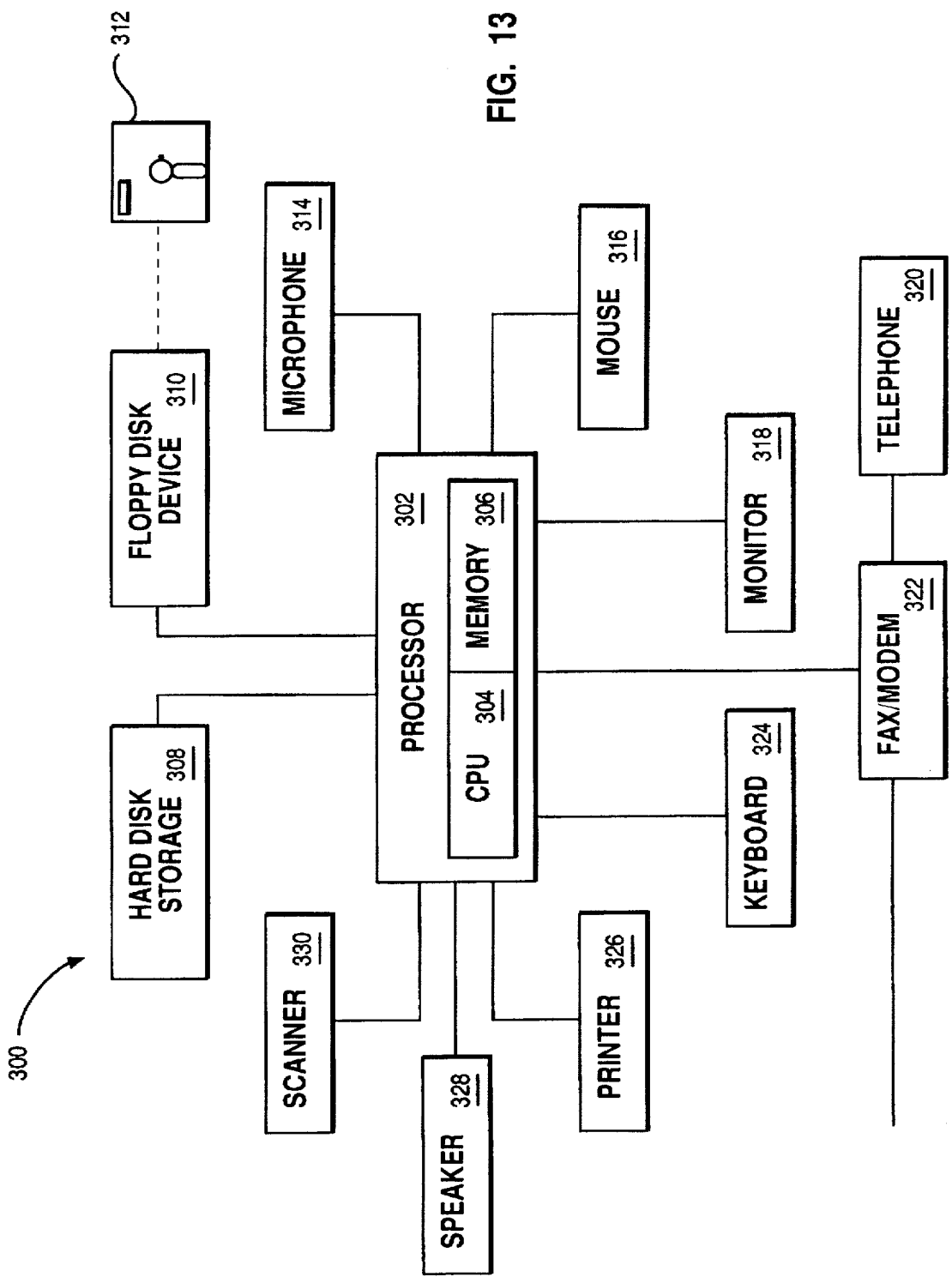
FIG. 13 is a workstation where the invention can be practiced.

Turning now to FIG. 13, there is shown a workstation/data processing system 300 where the invention may be practiced. The workstation 300 contains a processor 302 having a CPU 304, connected to memory 306 for communicating with a plurality of Input/Output devices. The hard disk storage 308 provides permanent storage of data/information for use by the processor 302. A floppy disk device 310 provides means for inputting data from a computer program product having a computer readable medium such as floppy diskette 312. One skilled in the art will appreciate that the computer program of this invention may be inputted to the processor 302, via the floppy diskette 312. A display monitor 318 is provided to allow a user to observe the execution of data on the processor 302. Data can also be inputted through microphone 314, keyboard 324, and scanner 330. Data displayed on monitor 318 can be manipulated using mouse 316. Output from programs operating on processor 302 may be obtained over printer 326 or speaker 328. The workstation 300 may be connected to a network over a fax/modem 322, which in turn may be connected to a telephone 320.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer, for providing a multiprocessor verification testing environment for testing storage components, comprising:
   providing a test specification of a cache coherence multiprocessor configuration having a plurality of caches and main memories to be tested in said multiprocessor verification testing environment;
   preloading initialization information for said caches and main memories;
   generating a set of test cases for exercising all transaction types and cache states for said caches and main memories in said cache coherence multiprocessor configuration based on said test specification;
   applying said test cases to a cache-coherent multiprocessor system having storage hierarchy mechanism to verify operation of said system;
   monitoring the completion of said test cases in said cache coherent multiprocessor system; and
   inputting data values for a subset of addresses in said caches and main memory.

2. A method, implemented in a computer, for providing a multiprocessor verification testing environment for testing storage components, comprising:
   providing a test specification of a cache coherence multiprocessor configuration having a plurality of caches and main memories to be tested in said multiprocessor verification testing environment;
   preloading initialization information for said caches and main memories;
   generating a set of test cases for exercising all transaction types and cache states for said caches and main memories in said cache coherence multiprocessor configuration based on said test specification;
   applying said test cases to a cache-coherent multiprocessor system having storage hierarchy mechanism to verify operation of said system;
   monitoring the completion of said test cases in said cache coherent multiprocessor system; and
   specifying constraints on the initialization and sequence of events at each of said plurality of caches in said test specification.

3. A method, implemented in a computer, for providing a multiprocessor verification testing environment for testing storage components, comprising:
   providing a test specification of a cache coherence multiprocessor configuration having a plurality of caches and main memories to be tested in said multiprocessor verification testing environment;
   preloading initialization information for said caches and main memories;
   generating a set of test cases for exercising all transaction types and cache states for said caches and main memories in said cache coherence multiprocessor configuration based on said test specification;
   applying said test cases to a cache-coherent multiprocessor system having storage hierarchy mechanism to verify operation of said system;
   monitoring the completion of said test cases in said cache coherent multiprocessor system; and
   specifying controls enabling the enumeration of a specified number of variables in said test specification subject to the execution of a preceding number of constraints.

4. A method, implemented in a computer, for providing a multiprocessor verification testing environment for testing storage components, comprising:

providing a test specification of a cache coherence multiprocessor configuration having a plurality of caches and main memories to be tested in said multiprocessor verification testing environment;

preloading initialization information for said caches and main memories;

generating a set of test cases for exercising all transaction types and cache states for said caches and main memories in said cache coherence multiprocessor configuration based on said test specification;

applying said test cases to a cache-coherent multiprocessor system having storage hierarchy mechanism to verify operation of said system;

monitoring the completion of said test cases in said cache coherent multiprocessor system; and automatically generating said test specification of a machine model from a canonical protocol table.

5. A method, implemented in a computer, for providing a multiprocessor verification testing environment for testing storage components, comprising:

providing a test specification of a cache coherence multiprocessor configuration having a plurality of caches and main memories to be tested in said multiprocessor verification testing environment;

preloading initialization information for said caches and main memories;

generating a set of test cases for exercising all transaction types and cache states for said caches and main memories in said cache coherence multiprocessor configuration based on said test specification;

applying said test cases to a cache-coherent multiprocessor system having storage hierarchy mechanism to verify operation of said system;

monitoring the completion of said test cases in said cache coherent multiprocessor system; and creating a machine model as an interconnected set of coherence elements having a plurality of processors as degenerate coherence elements that issue transactions without first receiving a transaction.

6. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and means for inputting data values for a subset of addresses in said caches and main memory.

7. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and means for specifying constraints on the initialization and sequence of events at each of said plurality of caches in said test specification.

8. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and means for specifying controls enabling the enumeration of a specified number of variables in said test specification subject to the execution of a preceding number of constraints.

9. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and wherein said cache-coherent multiprocessor system includes a hardware simulation model having a subset of storage hierarchy components within said system.

10. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and wherein said test cases are issued to said cache coherent multiprocessor system in a one-to-one mapping.

11. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and means for automatically generating said test specification of a machine model from a canonical protocol table.

12. An apparatus for providing a multiprocessor verification testing environment for testing storage components in a data processing system, comprising:

means for providing a test specification of a cache coherence multiprocessor configuration having a plurality of caches and main memories to be tested in said multiprocessor verification testing environment;

means for preloading initialization information for said caches and main memories;

means for generating a set of test cases for exercising all transaction types and cache states for said caches and main memories in said cache coherence multiprocessor configuration based on said test specification;

means for receiving said test cases and controlling the issuance of said test cases to said cache-coherent multiprocessor system to verify operation of said cache-coherent multiprocessor system; and means for creating a machine model as an interconnected set of coherence elements having a plurality of processors as degenerate coherence elements that issue transactions without receiving first receiving a transaction.

13. A computer program product having a computer readable medium having computer program logic recorded thereon for providing a multiprocessor verification testing environment for testing storage components, comprising:

computer readable means for providing a test specification of a cache coherence multiprocessor configuration having a plurality of caches and main memories to be tested in said multiprocessor verification testing environment;

computer readable means for preloading initialization information for said caches and main memories; and computer readable means for generating a set of tests for exercising all transaction types and cache states for said caches and main memories in said cache coherence multiprocessor configuration based on said test specification, and computer readable means for inputting data values for a subset of addresses in said caches and main memory.

14. A computer program product having a computer readable medium having computer program logic recorded thereon for providing a multiprocessor verification testing environment for testing storage components, comprising:

computer readable means for providing a test specification of a cache coherence multiprocessor configuration having a plurality of caches and main memories to be tested in said multiprocessor verification testing environment;

computer readable means for preloading initialization information for said caches and main memories; and computer readable means for generating a set of tests for exercising all transaction types and cache states for said caches and main memories in said cache coherence multiprocessor configuration based on said test specification, and computer readable means for specifying constraints on the initialization and sequence of events at each of said plurality of caches in said test specification.

* * * * *

UNITED STATES PATENT AND TRADEMARK OFFICE
CERTIFICATE OF CORRECTION

PATENT NO : 5,740,353
DATED : April 14, 1998
INVENTOR(S) : Kreulen et al

It is certified that error appears in the above-identified patent and that said Letters Patent is hereby corrected as shown below:

Column 14, line 49, please delete "<stream><#>" and insert --<stream#><#>--;
    14, line 50, please delete "<stream>" and insert --<stream#>--.

Signed and Sealed this

Fifteenth Day of June, 1999

Q. TODD DICKINSON

Attest:

Attesting Officer      Acting Commissioner of Patents and Trademarks